United States Patent [19]
Hawkins

[11] 3,925,595
[45] Dec. 9, 1975

[54] FRAMELESS DAMPING SPACER
[75] Inventor: Ronald G. Hawkins, Massena, N.Y.
[73] Assignee: Aluminum Company of America, Pittsburgh, Pa.
[22] Filed: Feb. 24, 1975
[21] Appl. No.: 552,222

[52] U.S. Cl. .................. 174/42; 174/146; 188/1 B; 403/111; 403/117; 403/162; 403/170
[51] Int. Cl.² ...................... H02G 7/14; H02G 7/12
[58] Field of Search ............... 174/40 R, 42, 146; 188/1 B; 267/136, 137, 148; 403/64, 111, 113, 117, 120, 162, 170, 174, 178, 217

[56] References Cited
UNITED STATES PATENTS
| | | | |
|---|---|---|---|
| 3,230,295 | 1/1966 | Short | 174/42 |
| 3,443,019 | 5/1969 | Walker et al. | 174/42 |
| 3,582,983 | 6/1971 | Claren | 174/42 |
| 3,777,047 | 12/1973 | Rawlins | 174/42 |
| 3,870,815 | 3/1975 | Hawkins | 174/42 |

FOREIGN PATENTS OR APPLICATIONS
| | | | |
|---|---|---|---|
| 1,551,947 | 11/1968 | France | 174/146 |
| 2,009,023 | 1/1970 | France | 174/146 |
| 1,084,102 | 9/1967 | United Kingdom | 174/146 |

Primary Examiner—Laramie E. Askin
Attorney, Agent, or Firm—Elroy Strickland, Esq.

[57] ABSTRACT

Devices for spacing overhead, parallel subconductors of a conductor bundle and for damping vibrations of the subconductors. The devices each comprise elongated, rigid arms pivotally connected together at one end and at a common, center location of the device, and having a clamp at the other end of each arm for attaching the arms to respective subconductors. Extending between and physically connected to the arms are resilient wire cables providing the primary damping mechanism.

18 Claims, 18 Drawing Figures

FRAMELESS DAMPING SPACER

BACKGROUND OF THE INVENTION

The present invention relates generally to a damping spacer for overhead conductor bundles, and particularly to a compact damping spacer that has no central frame, that is economical to manufacture, that is light in weight, and that requires a minimum of parts and material.

There are presently available a large variety of devices for spacing overhead, parallel conductors and for damping vibrations and oscillations of such conductors. However, all these devices have certain disadvantages that the spacer of the present invention does not have. Many of the presently available damping spacers, for example, employ a central frame on which conductor clamps are mounted, as a part of the structure designed to effect spacing of the conductors, and stop or motion limiting means for protecting damping elements associated with the spacer from overexertion by excessive forces encountered in an overhead bundle of conductors. The clamps of these devices usually have relatively short extensions or arms which are often connected to the frame only through the agency of the damping elements.

The use of a frame and certain motion limiting means is costly in that the components involved, and the processes of assembling them, involve costs that are reflected in the ultimate selling price of the spacer. Further, the short arms of the clamps do not provide a sufficiently effective lever for working the rather stiff damping elements (to initiate damping action) that are necessary to bear the weight of the frame and other suspended components.

Another disadvantage of the frame type spacer is the fact that the mass and weight of the frame adds to the overall weight of the spacer that must be borne by the line, this additional weight also involving additional cost in the process of shipping and transporting the spacers. Also, since the damping elements in frame type spacers, are generally located between the clamps and frame, the damping elements must support the weight of the frame. This places the damping elements under constant and continuous stress conditions after the spacer is installed in a conductor bundle, which tends to reduce the life and damping efficiency of the damping elements.

Examples of damping spacers employing a central frame and relatively short clamp arms are shown in U.S. Pat. Nos. 3,443,019; 3,474,184; 3,613,014; 3,748,370 and 3,777,047. Examples of spacers in which the damping elements support the weight of a frame are shown in U.S. Pat. Nos. 3,083,258; 3,443,019; 3,582,983; 3,617,609; 3,702,371 and 3,748,370.

Another problem encountered with certain of the presently available damping spacers is the inability of the arms of the spacers to return to their original, normal position after the arms are moved in response to conductor motion. The large power authorities, such as the Tennessee Vally and Bonneville Power Authorities, generally require that the spacer arms of a spacer return to a normal position under their own effort. Damping spacers using friction discs as the damping elements, for example, either depend upon the return movement of the conductors to return the spacer arms to their normal, original position, or a spring element is required to return the arms. Further, a spring is required to compensate for wear of the friction discs. A damping spacer using such friction discs and spring elements is shown in U.S. Pat. No. 3,474,184, listed above. In FIGS. 4 and 5 of British Pat. No. 1,084,102 a damping spacer is shown in which friction discs are used without a spring element to provide return of the spacer arms to a normal position. Spring elements, however, are used to preload the friction discs against the arms of the spacer.

Another disadvantage of several of the present and prior devices for spacing conductors is their inability to insure spacing of the conductors under severe, short circuit conditions. Short circuits on a conductor bundle involve flows of heavy current through the conductors that generate a corresponding strong magnetic field component that directs the conductors rapidly inwardly and in a stright line toward the geometric center of the bundle and thus toward each other. Unless a rigid spacing structure is provided to resist these forces, the conductors will come together and become entangled with each other. A central, rigid frame, used in the type of spacer discussed above, is helpful in this regard but suffers from the disadvantages of such frame type spacers outlined above. U.S. Pat. No. 3,230,295 shows a conductor spacing device that would function as an effective spacer under short circuit conditions, if constructed of suitably rigid, high strength materials, but the device does not perform damping of conductor vibration or oscillation since it does not employ a mechanism that is capable of dissipating the energy of such vibration or oscillation in any significant manner.

A further problem with certain, presently available damping spacers is the heavy stresses and cycling imposed upon the damping elements of the spacers by "articulation" of the spacer within a bundle of conductors. Individual conductors in a span of a conductor bundle tend to move relative to one another in a lengthwise or longitudinal direction of the conductors due to unequal contraction and stretching of the conductors, and due to the wind blowing across the conductors at velocities that bow the conductors in the direction of the wind by different amounts. These relative conductor movements and bows are large and thus cause any spacers clamped to the conductors to articulate within the bundle by corresponding large amounts. If the clamps clamping the spacer in the bundle are connected to a frame of the spacer through the agency of the damping element, the damping elements are heavily worked and stressed by such articulation, such heavy working greatly shortening the life of the damping elements. This is true even when resilient bushings are employed between the spacer clamps and the conductors. In order for such bushings to effectively protect the damping elements from such articulating movements, and the resulting heavy stresses, the bushings would have to be soft to the point that they would not effectively grip the conductor. Examples of damping spacers in which the damping elements of the spacers would be unprotected from such articulation stresses are shown in U.S. Pat. Nos. 3,582,983 and 3,702,371. An example of a spacer particularly designed to provide aarticulation movements within the spacer is shown in U.S. Pat. No. 3,263,021. Such a structure, however, provides little or no damping of conductor vibration or oscillation.

Another problem associated with presently available damping spacers is the general inefficiency of the damping mechanism. For example, the multiple damping means associated with frame type spacers generally work independently of each other in damping vibration of one conductor of a bundle of conductors so that only one damping element is operable to dampen the vibration, the other elements remaining inactive and unused. Also, in a frame type of spacer, each conductor clamp of the spacer requires a damping element, which again, adds to cost and weight of the spacer.

In damping spacers using elastomers as the damping mechanism, carbon is often employed as a constituent of the elastomer to provide the elastomer with the ability to conduct (or semiconduct) electrical current so that the spaced conductors and portions of the spacer structure are not electrically isolated from each other. However, carbon adds to the cost of the spacer and tends to reduce the fatigue life of the elastomer so that the damping efficiency of the elastomer decreases with time.

BRIEF SUMMARY OF THE INVENTION

Broadly, the present invention is directed to a damping spacer that does not have the disadvantages of the damping spaces discussed above, and, has therefore, the advantages of being light in weight (i.e., a three conductor spacer of the invention weighs only about five pounds), economical to make, requiring a minumum of inexpensive components, rigid in the direction of the forces caused by short circuits on the line so as to resist collapse of the spacer and bundle, efficient in damping oscillations and vibrations of the conductors, while protecting damping elements of the spacers from articulating movement of the spacer within a conductor bundle. These and other advantages result from a frameless spacer structure comprised simply of rigid arms or columns pivoted together at one end of each arm adjacent a center location of the spacer by means such as a single pin or bolt, with the arms extending radially outwardly from the location of their pivoted ends to respective conductors of a bundle, the arms having clamps at the conductor ends for clamping respective ones of the conductors. Damping of any oscillation or vibration of one or more of the conductors is effected by movement of a stranded wire cable extending between adjacent arms, and held in compression by each other acting through the adjacent arms. Damping is efficient and effected rapidly in that, with movement of one conductor and conductor clamp in a given direction about the pivoted end of the arm, one of the stranded cables is placed in further compression while compression is relieved and tension imposed on the other cables such that all of the cables are simultaneously worked to effect damping of the one conductor. In this manner, conductor motion is rapidly stopped thereby reducing the tendency of the one conductor to transfer its motion to the other conductors. This, in turn, significantly reduces working and wearing of the components of the spacer including its damping cables, as well as permitting the use of smaller diameter cables, which reduces the weight and cost of the spacer. In addition, friction between the pin and a moving arm or arms provides further damping, and provides it at variable rates in a manner explained in detail hereinafter. Further, the cables, in tension, insure spacing of the conductors.

Since the arms of the spacer are rigid columns that radiate outwardly from a center location of the conductor bundle, spacing of the conductors of the bundles is assured under short circuit conditions, the forces generated by such conditions being directed along the rigid arms of the spacer toward the center of the bundle to place the arms under a compression load. On rebound of the conductor the columns are placed under tension loading. With such a structure and function, no frame is necessary and no motion limiting means is needed to protect the damping cables from such forces, though such means can be added, if desired, by simply casting or forging integral, motion limiting means in the arms at their pivot ends, as explained in detail hereinafter. Further, with the pin at the pivot location of the arms, the only stress imposed upon the damping cables is that brought about by conductor motion; there is no frame or other structure to be supported by the cables so that the cables are free of the stresses associated with such a supporting function.

THE DRAWINGS

The invention, along with its advantages and objectives, will be better understood from consideration of the following detailed description and the accompanying drawings in which.

PREFERRED EMBODIMENTS OF THE INVENTION

Figure 1:
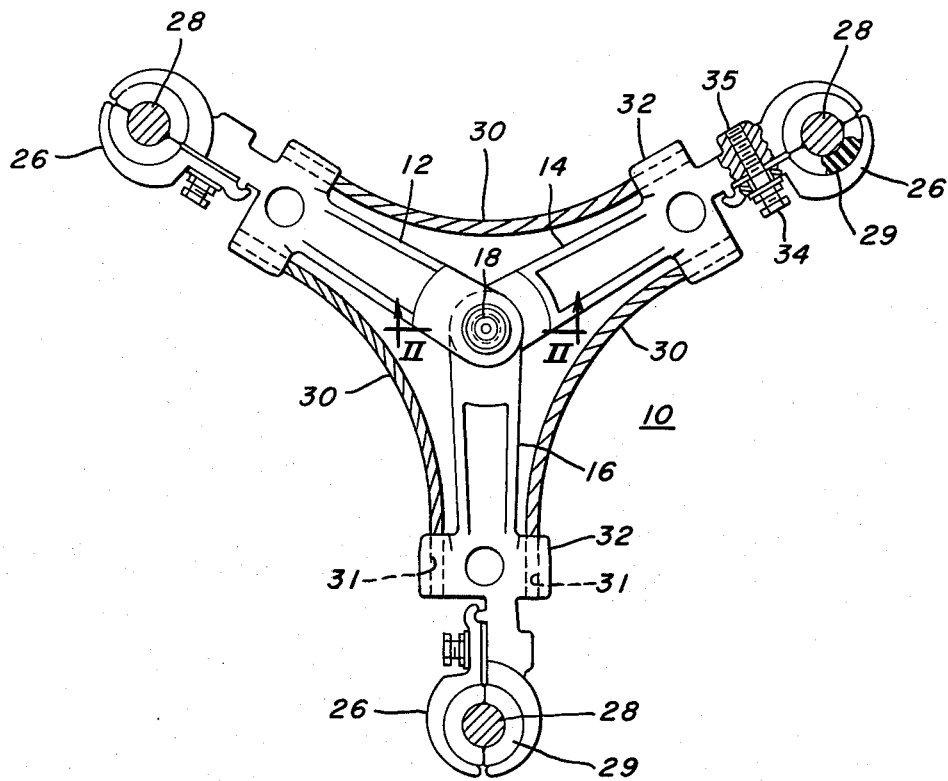
FIG. 1 is a side elevation view of a three conductor damping spacer of the invention.
Figure 2:
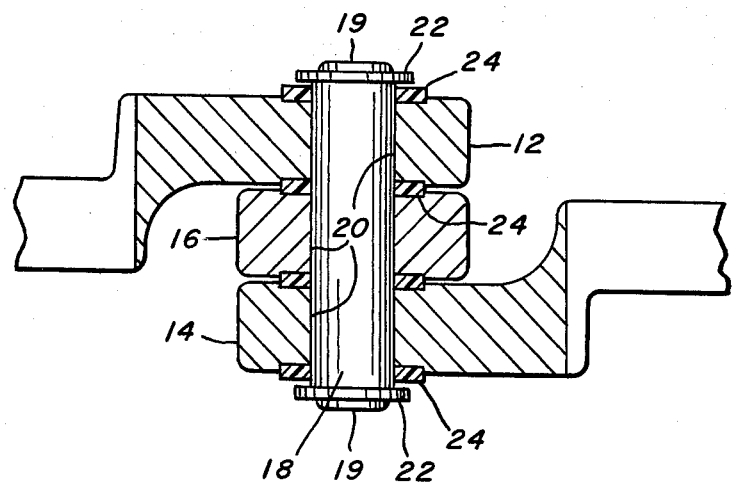
FIG. 2 is a sectional view of the structure of FIG. 1 taken along line II—II in FIG. 1.

Referring now to the drawings, FIG. 1 of the drawings shows a damping spacer 10, having three rigid spacer arms 12, 14 and 16 connected together at one of their ends adjacent a common, central location of the spacer by a rigid pin 18 extending through aligned openings 20 (FIG. 2) provided in overlapping end portions of the arms. As depicted in FIGS. 1 and 2, arms 12 and 14 are identical structures.

Preferably, pin 18 is riveted at each of its ends to secure the arms together, thereby eliminating the use of threaded fasteners which may become loose under the vibrating conditions encountered by the spacer. The securing function is effected by a flange portion 19 formed on each end of the pin when the pin is riveted. In FIG. 2, washers 22 are shown located between the flange portions and the arms. Further, the diameters of the pin and of the openings 20 in the arms are substantially the same so that the pin holds the arms in a fit that is snug but which allows the arms to pivot relatively on and about the pin when the conductors to which the arms are attached undergo oscillation or aeolian vibration.

As best seen in the view of FIG. 2, the pivot end of one of the three arms (arm 16) is located between the pivot ends of two outside arms (12 and 14), and the two outside arms can be offset, as shown in FIG. 2, to place the major extent of the arms in planes closely approaching a common plane. The overlapping ends of the arms are preferably separated from each other, and from the pin flanges 19 at each end of the pin, by relatively thin, heat resistant washers 24, as shown in FIG. 2.

At the end of each of the spacer arms 12, 14 and 16 opposed to the ends connected together by pin 18 is located means 26 for clamping the arms respectively to three subconductors 28 of a three conductor bundle, one-half of each clamping means being fabricated preferably as an integral part of its associated arm, as shown in FIG. 1. The arms and integral clamp halves, for example, may be formed by a casting or forging process in a relatively inexpensive manner, using a suitably strong, aluminum alloy to provide a device that is light in weight yet having a rugged, high strength characteristic. In FIG. 1, relatively thick, semi-conducting bushing halves 29 are shown located in curved seats of the clamp halves, though clamping devices may be used that directly engage the conductors 28.

Figure 9:
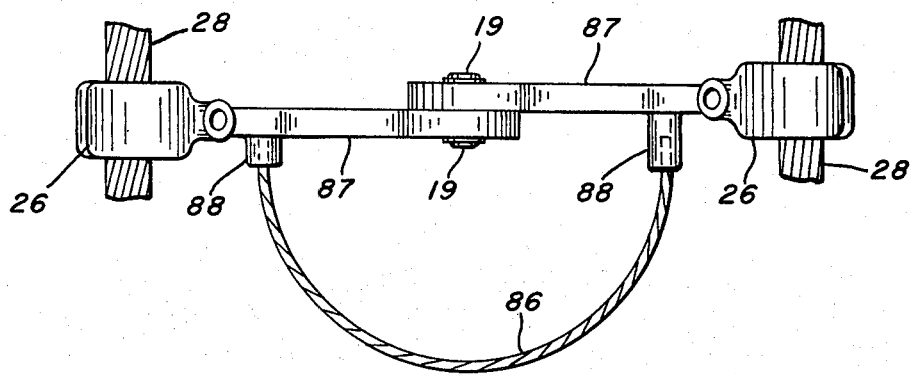
FIGS. 9 and 10 are respectively top and side elevation views of another embodiment of the invention.

Extending between and connected to each arm of the spacer 10, as thus far described, is a cable 30 preferably made of strands of a resilient steel wire twisted together in a helical pattern, the cables extending into bores 31 of opposed bosses 32 provided on the arms, as shown in FIG. 1. Each cable is held in compression by the other two cables acting through the arms and bosses, which compression places an inward bow on each cable, in the embodiments of the invention depicted in FIGS. 1, 3, 4, 7, 10 and 11. In FIG. 9 such cables are bowed outwardly.

The bosses 32 are shown as an integral part of the arms and conductor clamps, and in the embodiment of FIG. 1, for example, are located relatively close to conductor clamps 26. The ends of the cables extending into the bosses are secured therein by suitable means, such as by squeezing or crimping the bosses on the cable ends. A metal ferrule may be located on each cable end and in the bore of each boss, with the material of the boss tightly gripping the ferrule. Such a ferrule might be used, for example, as a bushing to fill a larger bore in each boss with a smaller diameter cable.

Figure 6:
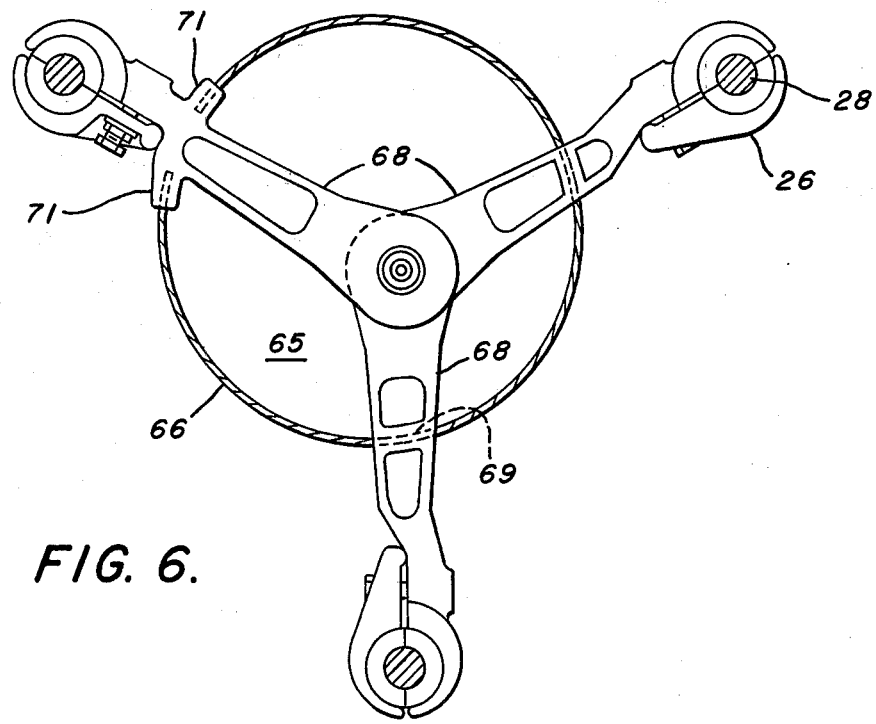
FIG. 6 is a side elevation of another three conductor damping spacer embodiment of the invention.

If the arms of the damping spacer 10 are of identical length and angular spacing, then the stranded cables 30 can be of identical length, though the configuration of the bundle of the conductors 28 determines the lengths of the cables and arms, and thus the working configuration of the spacer. In FIG. 6, for example, it will be noted that the cables (using a single, circular cable configuration) are not of the same length, the differences in length providing respective variable damping rates for the associated conductors, as explained hereinafter.

The damping spacer 10, as thus far described, functions in an efficient, effective manner to dampen and stop vibration and oscillation of one or more of the conductors 28 as soon as the movement of the vibration or oscillation occurs, and to space the conductors to which the arms of the spacers are connected. The spacer is, of course, first installed in a bundle of conductors, as shown in FIG. 1, with clamps 26 being secured respectively to the conductors using suitable means to fasten the halves of each clamp about a conductor. In FIG. 1, such a means is a bolt 34 extending through a separable clamp half and threaded into an opening 35 provided in each spacer arm. The clamp halves of each clamp are secured against the resilient bushing 29, the resilience of the bushing acting against the bolt to function as a means to lock the bolt, and thereby prevent it from working loose during any vibration of its associated conductor 28.

With the occurrence of a motion of one of the conductors 28 in the general plane of the spacer, which would be the plane of the paper of FIG. 1, all three of the cables 30 are set in motion in a team effort to dampen the conductor motion. This is the result of the unique structure of the spacer 10, and is explained in the following manner. With a vertical, downward motion of the conductor associated with arm 14 in FIG. 1, for example, which motion would occur with the conductor undergoing aeolian vibration, the arm 14 is moved in a downward direction as it pivots about pin 18. The downward movement of the arm places the upper cable 30, in FIG. 1, in relative tension, while the right-hand cable in FIG. 1, is placed in relative compression. The tension of the upper cable (with compression now on the right-hand cable) pulls (rotates) arm 12 toward arm 14 about pivot pin 18 to place the left-hand cable in tension. When the downward movement of the conductor (associated with arm 14) stops and the conductor begins its vertical rise (in the aeolian cycle), the above order of arm and cable movement is reversed, with an accompanying reverse in the changes in tension and compression of the cables. The compression-tension changes in the cables 30 work the cables in a manner that slides the component parts of the cable, i.e. the strands, relative to each other so that heat is generated by the resulting friction. Thus, the energy received by the conductor from the air currents causing vibration of the conductor is quickly dissipated in the form of heat, the heat being quickly dissipated to atmosphere from the cables, the air currents themselves helping to carry away the heat. With all three cables working in this manner for any one (or more) vibrating conductor, the vibration is rapidly stopped. The efficiency and effectiveness of such a damping function is in sharp contrast with that of a frame-type of spacer in which associate clamp arms and damping elements are generally separately mounted and pivoted. With such a structure, only the damping element directly associated with the vibrating conductor is operable to dampen the vibration.

Further, the clamp arms of spacer 10 are relatively long such that they provide substantial leverage (over the short arm extensions of some prior damping spacers) that is more effective in moving relatively heavy or stiff cables 30. Thus, the spacer of the present invention can be provided with a greater threshold of damping action in comparison to those devices providing small leverage on the damping mechanism. Also, the cables 30, when under tension, function to space the arms of the spacer, and the conductors to which the arms are attached. In this manner, the cables function as positive, conductor spacing means in the damping spacer of the invention, and are further effective to return the conductors to their normal, original position when moved from such a position since the cables are strong, resilient elements that have a memory of their original shape and configuration.

In addition, the spacer of the present invention provides a damping rate that is directly proportional to the amount of energy to be dissipated. As best seen in FIG. 2 of the drawing, the pin 18 and the openings 20 in the spacer arms provide bearing surfaces which rub against each other upon the occurrence of relative motions between the pin and arms. Such rubbing action generates heat which is effective to assist dissipation of the energy of conductor vibrations by dissipating this heat into the spacer arms and to atmosphere. In addition, however, as the amount of energy to be dissipated increases, each damping cable, in the process of being bent inwardly in response to conductor motion, assumes a smaller radius and a greater bending stress in comparison to the radii and stresses accompanying smaller movement of the conductor. This results in a greater force being imposed upon the pin and arm bearing surfaces by the cable exerting greater forces along the axes of the arms. With such greater forces additional friction is generated between the bearing surfaces of the pin and arms to provide increased energy dissipation capabilities for the spacer 10.

As explained earlier, with certain prior damping spacers, articulation of the spacer within a bundle, which is due to large, longitudinal movements of the conductors (28), places heavy stresses on the damping elements. In the present invention, the close, snug fit existing between the rigid pin 18 and the rigid, pivot ends of the spacer arms prevents the damping elements, i.e., cables 30, from being worked and stressed by such articulation. Rather, in the spacer of FIGS. 1 and 2, articulation stresses are absorbed by the thick resilient bushings 29 provided in the clamps 26 of the spacer arms. In the case where the clamps 26 directly engage the conductors, the spacer arms can then be resiliently spaced apart on the pivot pin 18 to permit relative movement of the arms along the pin for the purpose of accommodating relative longitudinal movements of the conductors.

With the relative rotational movement of the spacer arms about pin 18 caused by conductor vibration, sliding friction also occurs between heat resistant washers 24 and the flat surfaces of the arms in contact with the washers. Such friction provides additional damping actions, as the heat generated by the friction is dissipated to the air and air current moving past the spacer.

With spacer 10, while the arms of the spacer are at rest, the damping elements (cables 30) are free of stress, there being no frame or other structure to be supported by the damping elements. In this manner, the life of the cables and their efficient operation as the damping mechanism are extended.

The damping action described above in connection with aeolin vibration and the variable damping rate feature just described is particularly effective to dampen oscillations of a conductor 28, which oscillations involve amounts of energy that are substantially greater than those of aeolian vibrations. Thus, the variable, proportional damping rate feature described above is particularly suitable for dissipating such greater amounts of energy. When oscillating, the conductor undergoes a generally circular or elliptical motion about the axis of the conductor at rest, such a motion simultaneously placing all three of the damping cables 30 into changing tension and compression conditions. As indicated earlier, such a simultaneous damping effort allows the use of damping cables that are smaller, and thus lighter in weight, than those employed in devices in which a single cable or other damping mechanism is required to dampen conductor vibration.

A further advantage of damping spacer 10 is its capability of being adjusted to conditions the spacer will encounter on a line without the need to change the basic design of the spacer. This is accomplished by simply choosing an appropriate length of the damping cables 30, a shortened cable providing a relative high threshold of vibration energy to initiate damping action while a longer cable provides a lower threshold of damping. Such a feature is important since vibration energies vary considerably from line to line, such variations depending upon geographical and weather conditions and on the diameters and tensions of the conductors.

Another advantage of the damping spacer of the invention is associated with the location of the spacer arms and pivot pin 18 and their relation to a symmetrical or the geometrical center of the spacer. As discussed earlier, short circuits on a line generate forces that are directed inwardly to the center of the bundle such that the conductors are forced toward the center and thus toward each other. Since the pivot pin and arms of the spacer of the invention are rigid and since the arms extend directly into the center of the bundle when installed in the bundle, and to the pin, the arms and pin are directly in line with such forces such that these forces are easily and directly resisted by the arms and pin. In this manner, the conductors of the bundle are prevented from coming together when a short circuit occurs on the bundle. The size and material of the arms and pin are such that their strength is sufficient to handle compression and shear forces that act on them. In addition, since such inwardly directed forces are in line with the rigid arms and pin, the necessity for mechanical stop or motion limiting means to protect the damping cables from such forces is removed. If desired, however, an inexpensive stop means suitable for spacer 10 is disclosed hereinafter in connection with other spacer embodiments of the invention.

Figure 3:
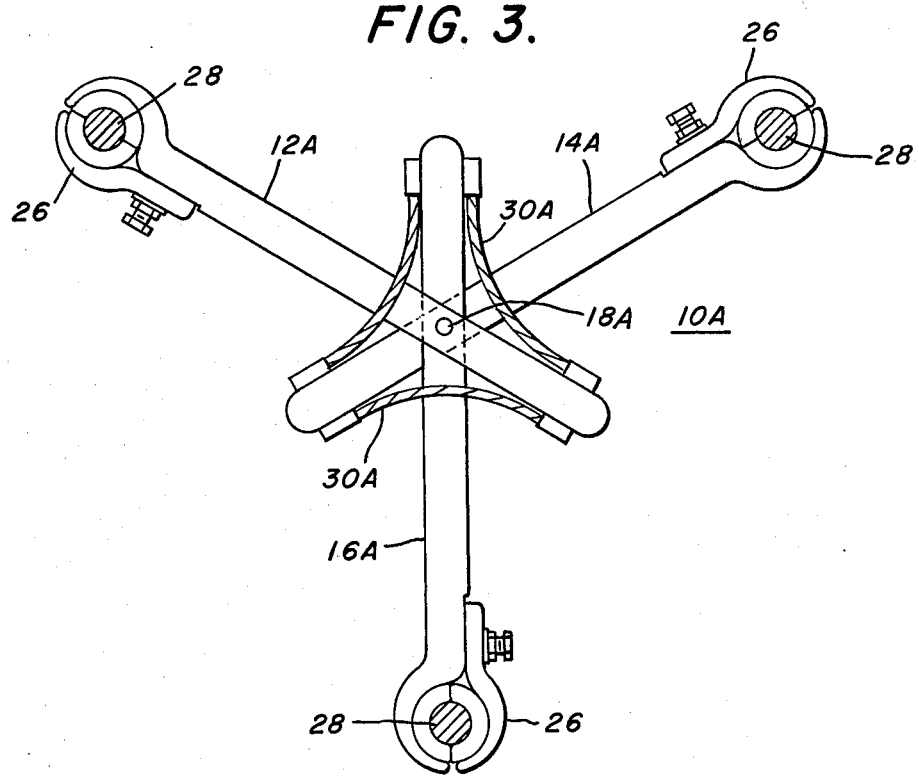
FIG. 3 is a diagrammatic presentation of a three conductor damping spacer of another embodiment of the invention.

In FIG. 3 of the drawings is shown an embodiment of the invention in which spacer arms 12A, 14A and 16A of a spacer 10A extend a substantial distance beyond a pivot pin and location 18A in a direction away from conductors 28 and conductor clamps 26 to thereby accommodate resilient damping cables 30A extending between and attached to the ends of the arms that are remote from the conductors and conductor clamps. Such a structure and device functions in the manner described above in connection with the damping spacer of FIGS. 1 and 2, and has the general advantages of that spacer.

Figure 4:
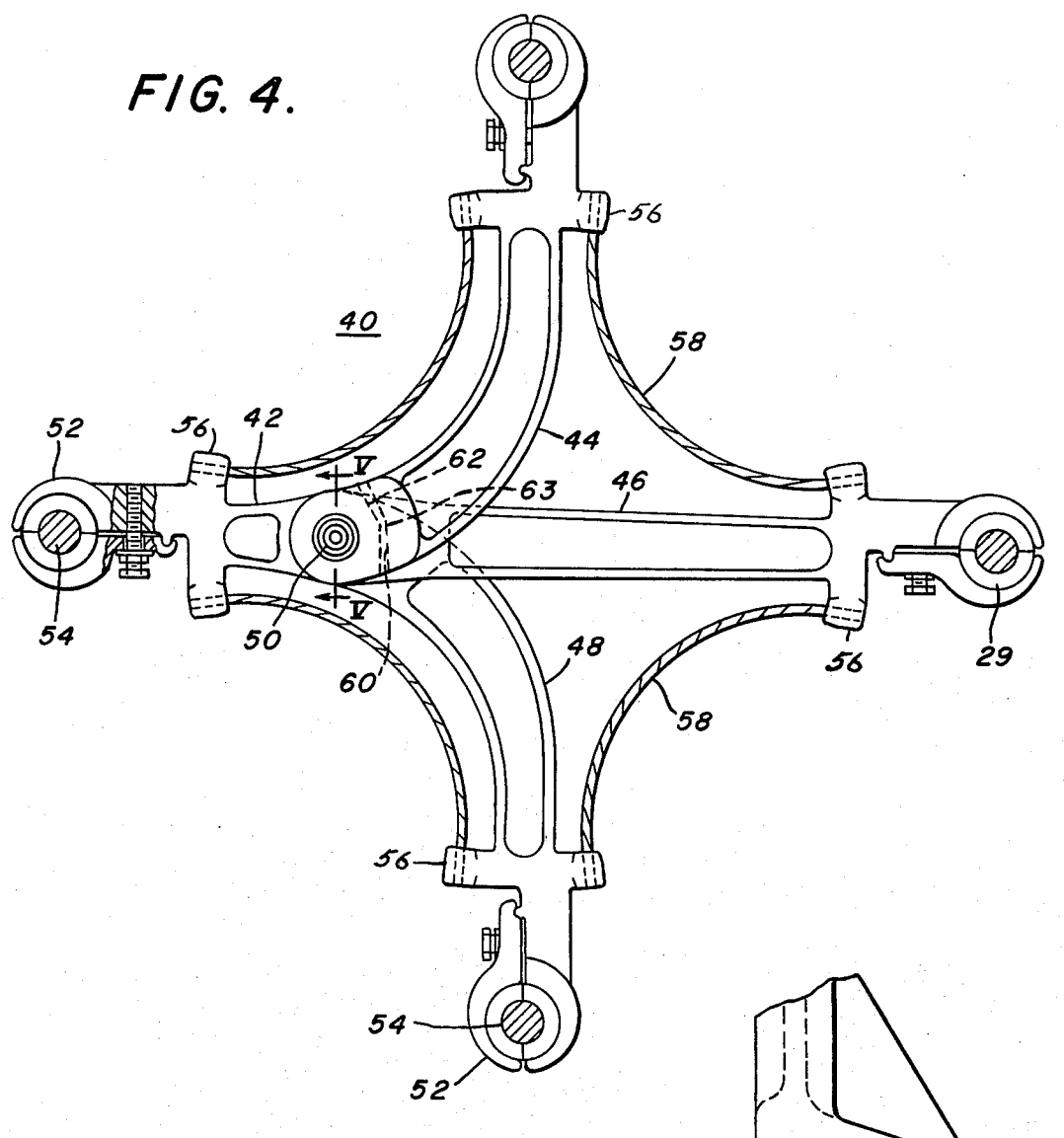
FIG. 4 is a side elevation view of an embodiment of a four conductor damping spacer of the invention.

FIG. 4 of the drawings shows a four conductor damping spacer 40 of the invention in which four rigid spacer arms 42, 44, 46 and 48 are pivotally connected together at one of their ends and at a common location by a rigid pin 50 (FIG. 5), the location of pin pivotal connection being laterally offset from the center of the spacer for reasons explained hereinafter. As in the case of the spacer of FIGS. 1 and 2, the ends of the arms remote from the pivot location are provided with devices 52 for clamping the spacer 40 to a bundle of four conductors 54, the clamping devices being comprised of clamp halves, with one of each half being an integral part of its associated spacer arm, while the other half is separable therefrom.

Extending between the four arms of the spacer 40, and suitably attached to the arms, via two opposed bosses 56 associated with each arm, are resilient, stranded wire cables 58 that provide the spacer with the damping capabilities described above in connection with damping spacers 10 and 10A, the cables being bowed inwardly and held in compression by each other acting through the four arms and their bosses.

The structure of FIG. 4, as thus far described, is particularly suitable for damping a four conductor bundle having a diamond configuration (as opposed to a square or rectangular configuration) in which two of the conductors are disposed in the same horizontal plane and two of the conductors are located in the same vertical plane, with the two planes straddling each other. Such a configuration is preferable over the square or rectangular bundle as it is aerodynamically more stable than the square or rectangular bundle.

As indicated earlier, aeolian vibration of a conductor occurs in essentially a vertical plane such that, with a rigid arm or arms spacing two, vertically opposed conductors, and pivotally connected to each other by a rigid pin, the arm or arms are not compliant in the vertical direction to effect movement of a damping element. For this reason, in the four conductor spacer embodiment of FIG. 4, which embodiment is for a diamond shaped bundle, the pivot location of the four spacer arms is horizontally or laterally offset to allow relative rotational movement of vertical arms 44 and 48 toward and away from and about pivot pin 50 with vertical vibration of the upper and/or lower conductors 54. As shown in FIG. 4, the location of the pivot of the arms can lie in the plane of the horizontal conductors since overhead conductors are not generally subject to a horizontal vibration that closely corresponds to the type of conductor motion involved with aeolian vibration. As indicated above, oscillation (as opposed to aeolian vibration) of a conductor generally involves a circular or elliptical motion (in the plane of the spacer), such a motion having a vertical component sufficient to move vertical arms 44 and 48 and thereby flex stranded cables 58 to provide immediate damping of the oscillation. For this reason the horizontal arms (42 and 46) that space the horizontal conductors can extend in a straight line between pivot pin 50 and the horizontal conductors.

As indicated in FIG. 4, the two vertical arms (44 and 48) that extend to the upper and lower ones of the conductors 54 are preferably inwardly curved to accommodate the pivot location of the spacer arms and the inward bow of the damping cables 58 located on the side of the spacer having the pivot location.

Figure 5:
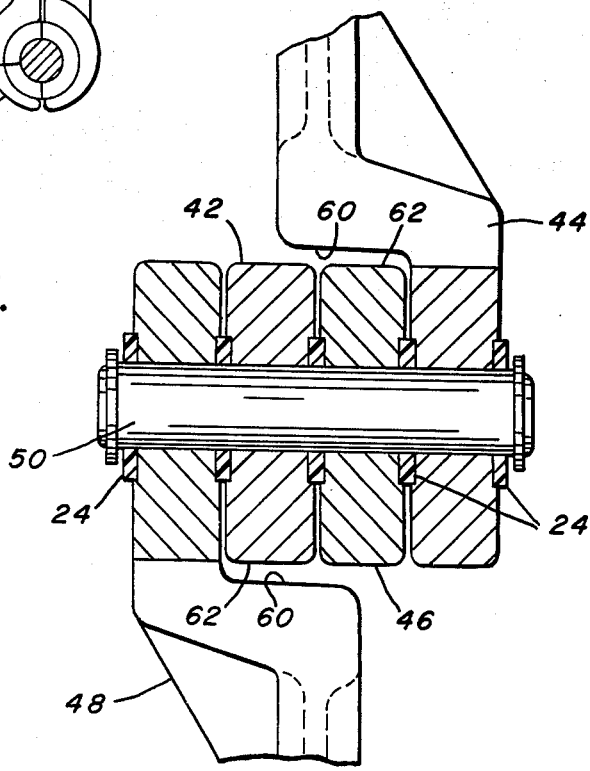
FIG. 5 is a sectional view of the spacer of FIG. 4 taken along lines V—V in the figure.

Since, as explained earlier, the forces developed with the occurrence of short circuits on a bundle rapidly direct the conductors toward the center of the bundle, and since the spacer 40 is compliant in a vertical plane extending generally through the center of the bundle, the arms of spacer 40 can be provided with means to mechanically limit inwardly directed, rotational movement of the arms 44 and 48. Such means is provided inexpensively in spacer 40 by simply providing the ends of the arms of the spacer adjacent pivot pin 50 with opposed, narrowly spaced, planar portions 60 and 62, as indicated in FIGS. 4 and 5. The planar portions 62 intersect each other and form outwardly facing corners 63 that engage planar surfaces 60 when the arms are relatively rotated about the pin by an amount predetermined by the narrow space between planar portions to stop further relative movement. Such a motion limiting means protects cables 58 from being over-stressed with the occurrence of short circuits or other violent motions occurring on the line, and is inexpensive to provide since the planar surfaces can be formed when the arms are fabricated, such as by casting or forging techniques.

In FIG. 6 of the drawings, another three conductor bundle, damping spacer 65 is shown in which a single, somewhat circular, resilient cable 66 is employed to provide damping of vibrations or oscillations of one or more of conductors 28, generally in the manner described earlier in connection with the structure of FIGS. 1 and 2 of the drawings. In addition, the spacer of FIG. 6 provides three different damping rates respectively for the three conductors in a manner presently to be explained, the three conductors being spaced by three, elongated, spacer arms 68 pivotally connected to each other at one of their ends in the manner of the spacer of FIGS. 1 and 2.

As seen in FIG. 6, the single cable 66 extends through openings 69 provided in two of three spacer arms, with the third arm being provided with bosses 71 adapted to grip and secure the two ends of cable 66, and which completes the generally circular configuration of cable 66. The two spacer arms through which the cable passes, and the cable, are secured together to maintain the angular, spaced relationship of the three arms. This can be accomplished, for example, by compressing the arms (or bosses integral therewith) on the cable after the cable is inserted in openings 69 in the arms, after each of the two arms are properly, angularly spaced from each other and from the arm with the bosses 71.

In viewing the spacer of FIG. 6, it will be noted that the cable 66 joins the spacer arms 68 at different radial locations along the lengths of the arms. This provides a different length of cable between each two adjacent arms, and thus a different damping effort for each of the cables. Such a damping spacer is particularly suitable for bundle configurations in which the energies of respective subconductor vibrations or oscillations tend to be different. For example, it has been found that the upper subconductors of conductor bundles tend to require a softer motion and thus a softer damping mechanism. This can be accomplished by increasing the radius of the stranded cable between the upper conductors, which cable bends outwardly and thus away from the center of the spacer in the embodiment of FIG. 6. Conversely, to stiffen the spacer 65, the radius of the cable 66, and thus the length of the arm between the pivot pin and the location of cable attachment to the arms, is reduced. In addition, additional cable accommodating openings (not shown) may be provided in spacer arms to provide a choice of damping capabilities before the spacer is assembled.

Figure 7:
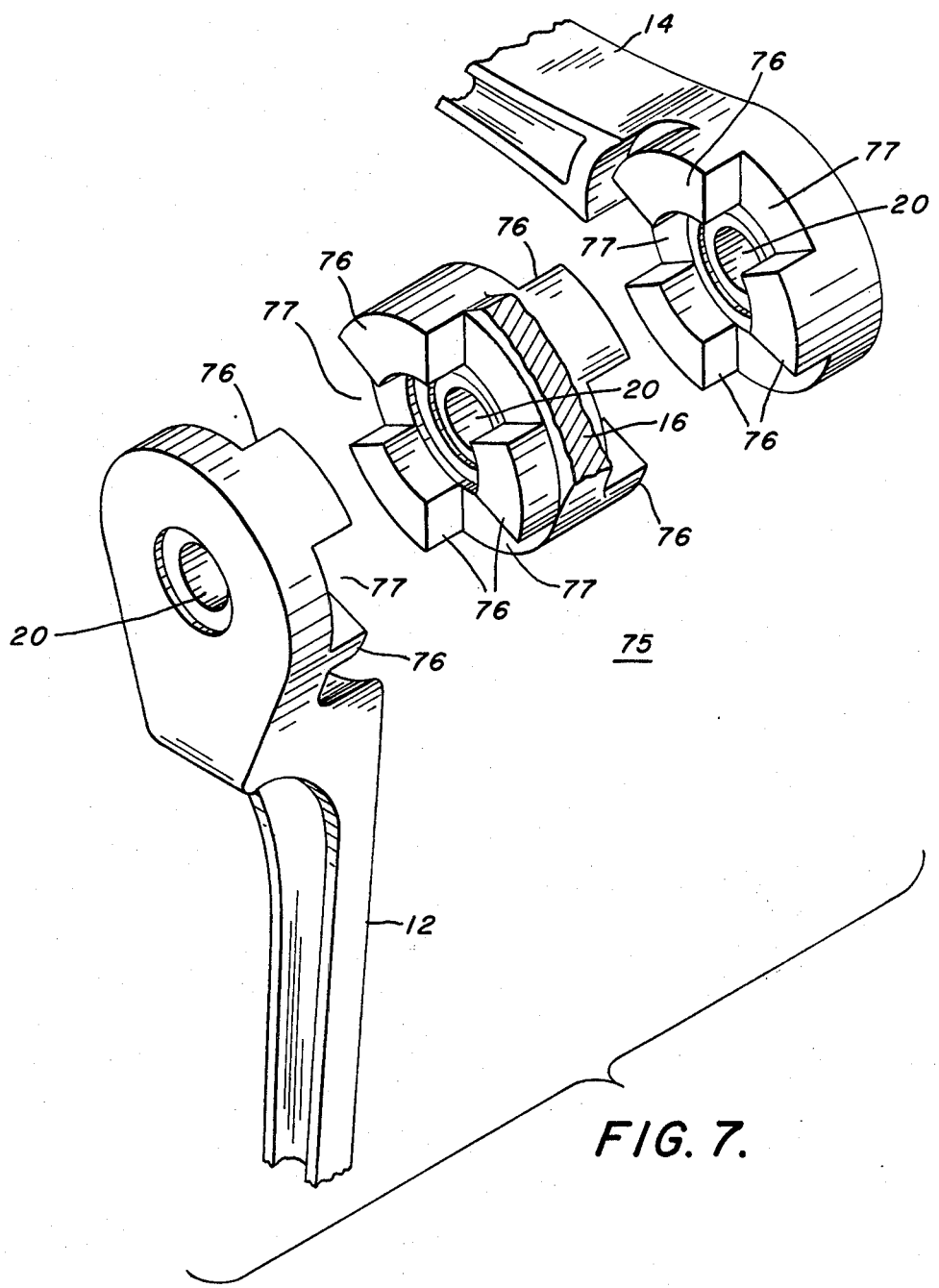
FIG. 7 is a partial exploded view of yet another embodiment of the invention.

FIG. 7 of the drawings shows a partial exploded view of a three conductor damping spacer embodiment 75 of the invention in which the hub portion of the spacer is provided with relatively deep, interdigital teeth structures 76 angularly spaced about and radially spaced from openings 20 adapted to receive a pivot pin (not shown). A side elevation view of the teeth structures is shown in FIG. 8 of the drawings.

The teeth 76 are conveniently and inexpensively provided in the pivot ends of spacer arms 12, 14 and 16 when the arms are fabricated, such as by a casting or forging process. In the three conductor embodiment of FIG. 7, the outside spacer arms 12 and 14 are provided with three large teeth angularly separated from each other by three corresponding, large recesses 77 dimensioned to accommodate three similar teeth of the inner arm 16 in mating relationship, the teeth and recesses being dimensioned to provide a relatively narrow space between adjacent teeth when the arms are assembled and secured together by a pivot pin. The inner arm 16, as seen in FIG. 7, has opposed, angularly rotated, alternate teeth and spaces 76 and 77 that face outwardly toward the outside arms. As best seen in FIG. 8, the mating teeth and spaces extend at generally right angles to the plane and axis of their associated arms.

Relative movement of overhead conductors 28 (about the pin 18 securing the arms together) to which the arms of the spacer 75 are attached is limited by an amount predetermined by the dimension of space between the mating teeth. When this amount of movement is exceeded by the conductors, the teeth 76 impact against each other to generate heat energy that is quickly dissipated into the body of the teeth and to atmosphere to dissipate the energy of the conductor motion, and thereby dampen the conductor motion in combination with the friction damping afforded by the stranded cables 30 and friction discs 24 (FIG. 2). In this manner, the spacer of FIG. 7 is provided with enhanced damping capabilities. In addition, the teeth 76 of the spacer function as stop means to protect the stranded cables from violent, high energy movements of conductors 28, and to provide positive conductor spacing under such conditions.

Figure 8:
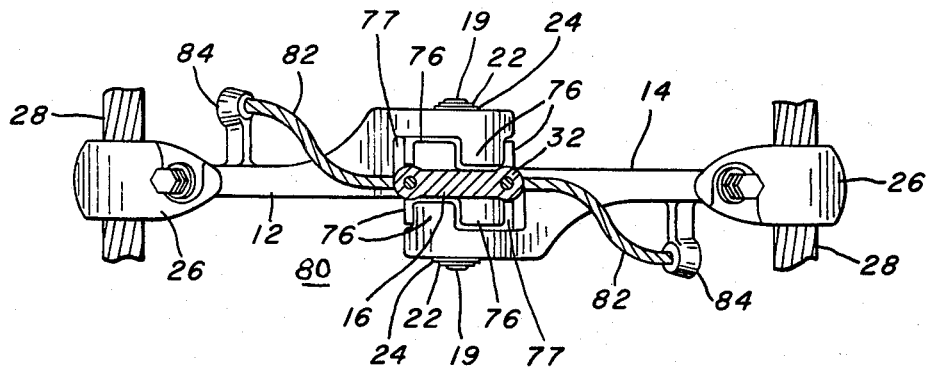
FIG. 8 is an elevation view of yet another embodiment of the invention.

In FIG. 8 of the drawings, there is shown a three conductor damping spacer 80 having at least two stranded cables 82 connected to arms 12, 14 and 16 of the spacer in such a manner that the cables are effective to preload friction discs 24 located between the spacer arms in the manner and for the purposes described above in connection with the spacer of FIGS. 1 and 2. This is accomplished in FIG. 8 by fastening one end of each of the two cables 82 to two adjacent spacer arms 12 and 14 respectively on opposite sides of the arms, via opposed bosses 84, as indicated in FIG. 8, with the other ends of the two cables being attached to the third arm 16 at locations 32 that are essentially in line with and in the plane of the third arm. The arm 16 and integral, attaching bosses 32 are shown in cross section in FIG. 8. A third stranded cable extending between arms 12 and 14 and associated attached bosses are obscured by these arms in the view of FIG. 8.

The axes of the bosses 32 and 84 and their openings extend in directions that are generally parallel to the spacer arms such that when the cables 82 are inserted and secured in the bosses, a generally S shaped, compound twist is provided in cables 82, as indicated in FIG. 8. With such a shape and twist, the cables 82 seek to return to a normal, straight position thereby placing opposed, inwardly directed forces on the discs 24 located between the arms. Such forces preload the discs and thereby ensure damping action via sliding friction between the arms and discs upon the occurrence of relative circular movement of the arms about pin 18.

In addition, the lengths of cables 82 in the embodiment of FIG. 8 are somewhat longer than their counterparts in FIG. 1 to provide the spacer of FIG. 8 with a damping capability different from that of FIG. 1.

It is desirable to have a relatively small diameter stranded cable as the damping mechanism for use in conductor bundles having a reduced space between the conductors of the bundle. However, small diameter spring steel cables are not always available so that a longer, free length of the heavier cable is necessary in order to obtain a sufficiently soft motion of the cable for damping purposes, the larger diameter cables being relatively stiff, i.e., too short length of such a cable would provide little or no damping of conductor vibration.

Figure 10:
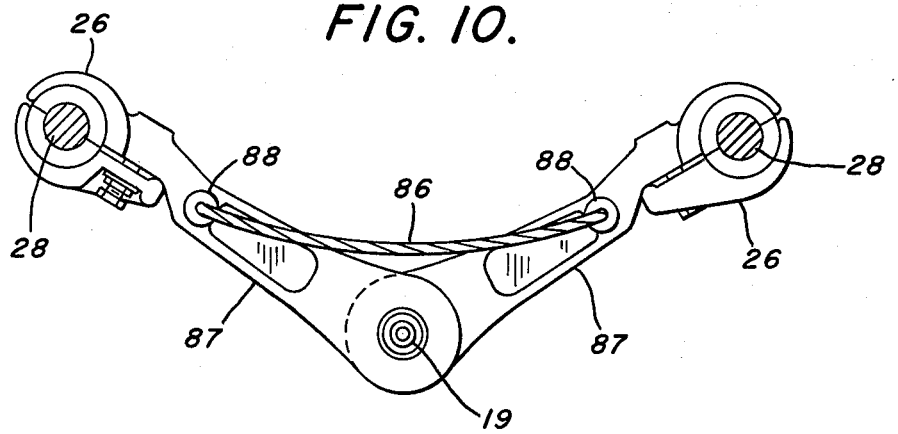

This problem is solved in the embodiment of the invention shown in FIGS. 9 and 10 in which a resilient, stranded wire cable 86 is bowed outwardly from and in a plane generally normal to the plane of two spacer arms 87 (pivotally connected together in the manner of the earlier described spacers), and downwardly from the angle of the arms, as indicated in FIG. 10, to form a compound bend in the cable. Such a compound bend and cable configuration provides the needed, additional free length for larger diameter cables and for the more narrow spaces encountered in the closely spaced, parallel conductors. As described above in connection with the other embodiments of the invention, the spacer arms 87 may be provided with bosses 88 as a means to conveniently mechanically connect the cable ends and spacer arms together, the bosses extending at generally right angles to the arms. In addition, though the structure depicted in FIGS. 9 and 10 is a damping spacer for a two conductor bundle spacer, the principles involved are applicable to damping spacers for three or more conductors.

Figure 11:
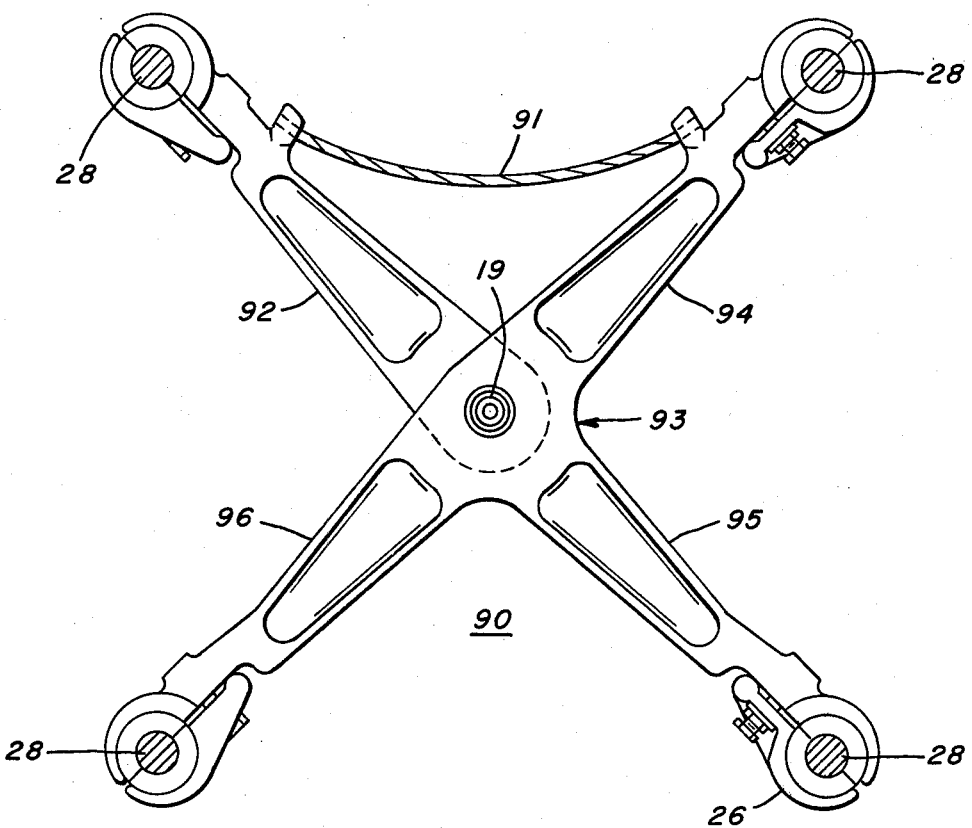
FIG. 11 is an elevation view of a damping spacer of the invention requiring a reduced number of arm components.

FIG. 11 of the drawings shows a device 90 for spacing and damping conductors 28 of a four conductor bundle, the device having only one stranded damping cable 91 and only two arm structures 92 and 93. One of the arm structures, i.e., arm 92 provides a single spacing arm, while structure 93 is an integral member providing three angularly disposed, spacer arms 94, 95 and 96. Such a structure as 93 (with arms 94 to 96) may be made by a single casting or forging operation, thereby providing an economical way to provide triple spacing arms. The single arm structure 92 is pivotally secured and connected to the triple arm structure 93 at or near a center location of the structure in the manner described above in connection with the spacer of FIGS. 1 and 2. Vibration or oscillation of any one of the conductors to which the arms are connected is effective to cause relative movement of the structures 92 and 93 to cause flexing of cable 91 and thus damping of the vibration or oscillation, though the single cable does not provide the damping efficiency of the spacer embodiment of FIGS. 1 and 2. The structure, however, of FIG. 11 is suitable for applications where substantial damping efficiency is not a primary consideration, the spacer of FIG. 11 being, in addition, an economical device to make since fabrication and assembly of only two cast or forged structures is involved.

The economies and damping functions afforded by the four conductor spacer of FIG. 11 are available for a three (or more than four) conductor spacer in which a single arm may be pivotally connected to a structure comprised of a plurality of integral arms, with at least one damping cable resiliently connecting the single arm and integral arm structure together.

Figure 12:
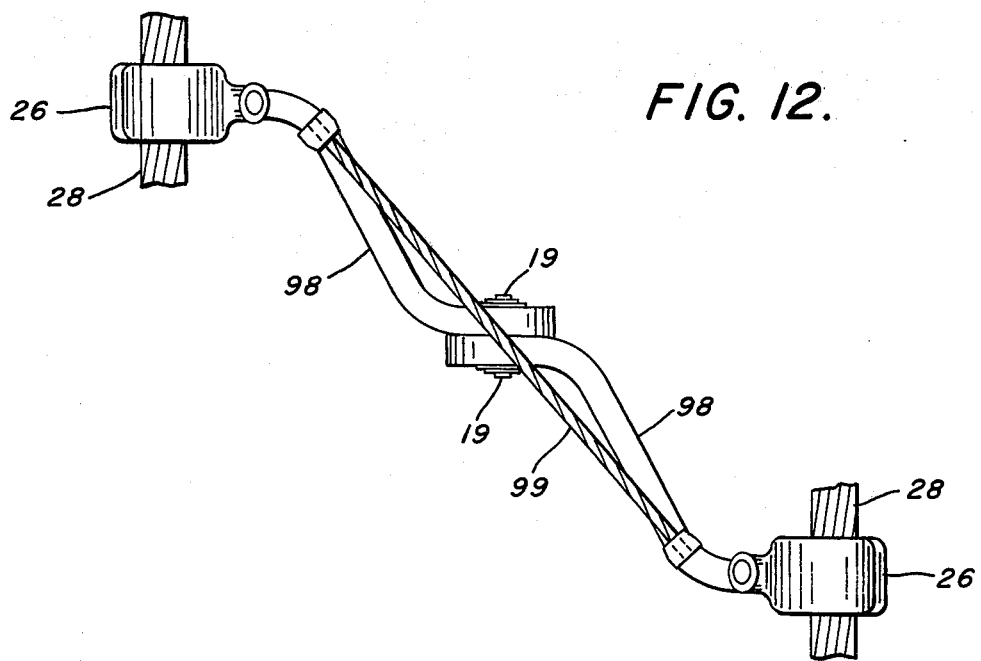
FIG. 12 is a top view of yet another embodiment of the invention.

As explained in applicant's copending application Ser. No. 444,322, now U.S. Pat. No. 3,870,815 aeolian vibrations of parallel conductors caused by a steady wind flowing across the conductors produces an in-phase loop or cycle length and frequency of the motions of vibrations of the conductors between towers supporting the conductors if the conductors have the same diameter, weight (pounds per foot length) and tension. With such in-phase movement of the conductor, little or no relative movement of the clamps 26 of the arms of a damping spacer can take place to effect damping of the vibration if the arms are clamped to the conductors at substantially the same distance from the towers. However, by laterally offsetting the conductor clamps of a spacer as explained in applicant's copending application (now U.S. Pat. No. 3,870,815), the arms are attached to respective conductors at unequal distances from the supporting towers, and thus at different locations on the cycle of conductor motion. In the present invention, this is accomplished by the generally S-shaped clamp arms 98 shown in FIG. 12 of the drawing, attached to two conductors 28, with a stranded wire cable 99 connected to the arms by bosses located behind conductor clamps 26. In this manner, with in-phase movement of the conductors, the conductor clamps, and hence the clamp arms 98, are moved relatively to each other (about a pivot location 18) since the clamps are disposed at locations on the conductors that are moving relatively to one another, the offset providing a motion multiplier effect. With such movement of the arms and clamps, the stranded cable 99 is worked to provide damping of conductor vibration or oscillation, the cable being inwardly or outwardly bowed between the arms 98, the arms being angularly disposed with respect to each other in the cross section of the bundle of the two conductors 28.

Figure 13:
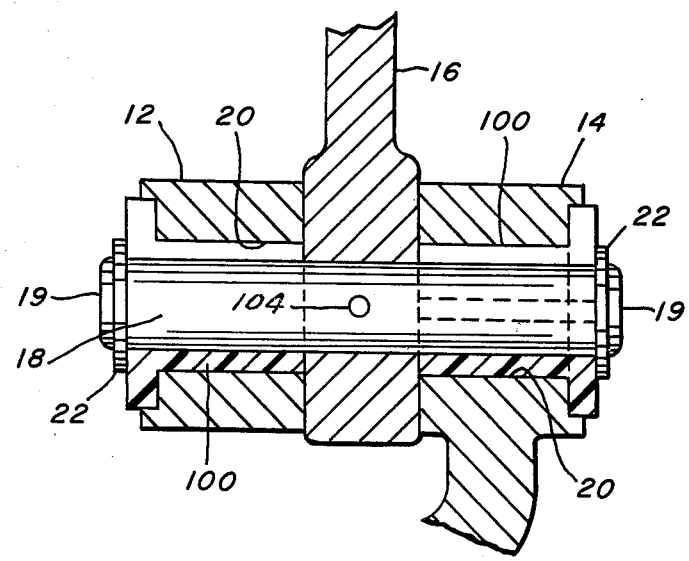
FIG. 13 is a partial view of an embodiment providing additional damping action in the spacer of the invention.
Figure 16:
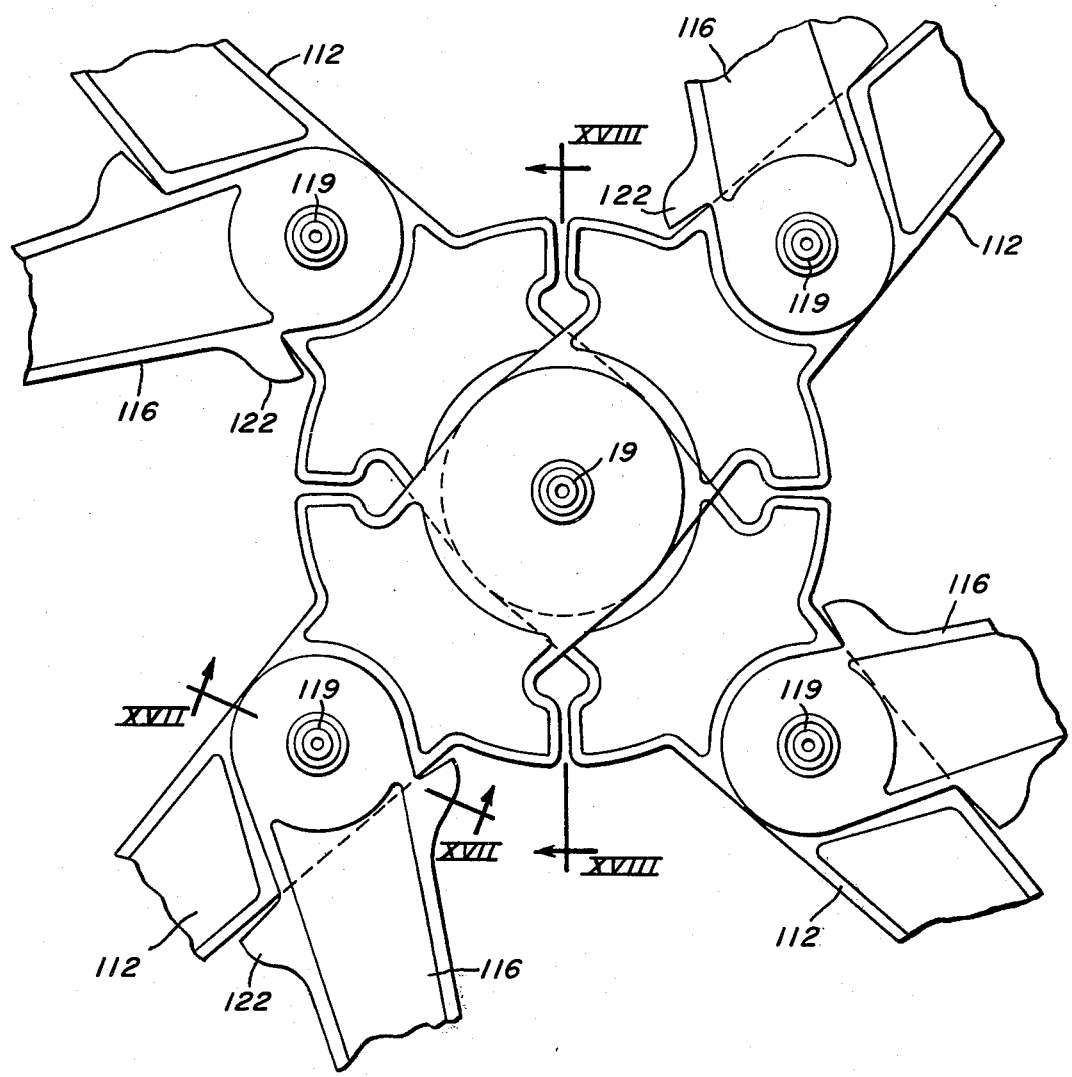
FIG. 16 is a partial, enlarged view of the damping spacer of FIG. 15.

Additional damping in the hub areas of the spacer embodiments of the invention can be provided by the use of a bushing 100 (FIGS. 13 and 14) located around at least a portion of the shank of pin 18, the bushing being made of a heat resistant, friction generating material, such as Teflon. In FIG. 13, two such bushings are shown extending through opposed, appropriately dimensioned openings 20 provided in two outside arms 12 and 14 of a three arm spacer, the bushings being secured in the openings by the pin and end washers 22 in the manner described above in connection with the device of FIGS. 1 and 2.

Figure 14:
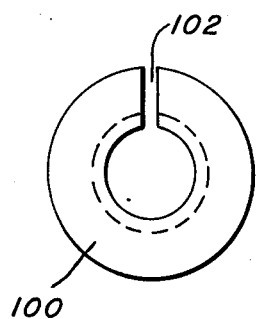
FIG. 14 is an end view of a viscoelastic bushing used in the embodiment of FIG. 13.

Preferably, bushing 100 is provided with an internal diameter that is somewhat less than the diameter of pin 18, and, as indicated at 102 in FIG. 14 of the drawings, is split along its length dimension to permit the bushing to be opened to receive the pin for assembly of the two components together. After they are assembled and are secured in the hub of the spacer by pin 18, the bushing contracts on the pin because of its smaller internal diameter, and continues to contract on the pin as it seeks its original diameter as the bushing wears in the process of providing damping action. In this manner, the bushing provides a continuing snug fit on the pin and thus provides automatic compensation for internal diameter wear of the bushing while the spacer is being employed to space and dampen the conductors of a conductor bundle.

The center arm 16 of the spacer may be keyed to pin 18 by a lock pin 104, for example, to insure rotation of pin 18 within bushings 100 with relative movement of the arms.

With vibration or oscillation of one or more of the conductors to which the spacer arms are attached, the outside spacer arms 12 and 14 rotate relatively to the bushings 100 to cause friction between the bushings and arms, while pin 18 rotates within the bushings, with movement of center arm 16, to produce friction between the pin and bushings. In this manner, heat is produced, which heat is conducted to the spacer arms and pin and to the atmosphere to dissipate at least a portion of the energy of the conductor vibration or oscillation.

Figure 15:
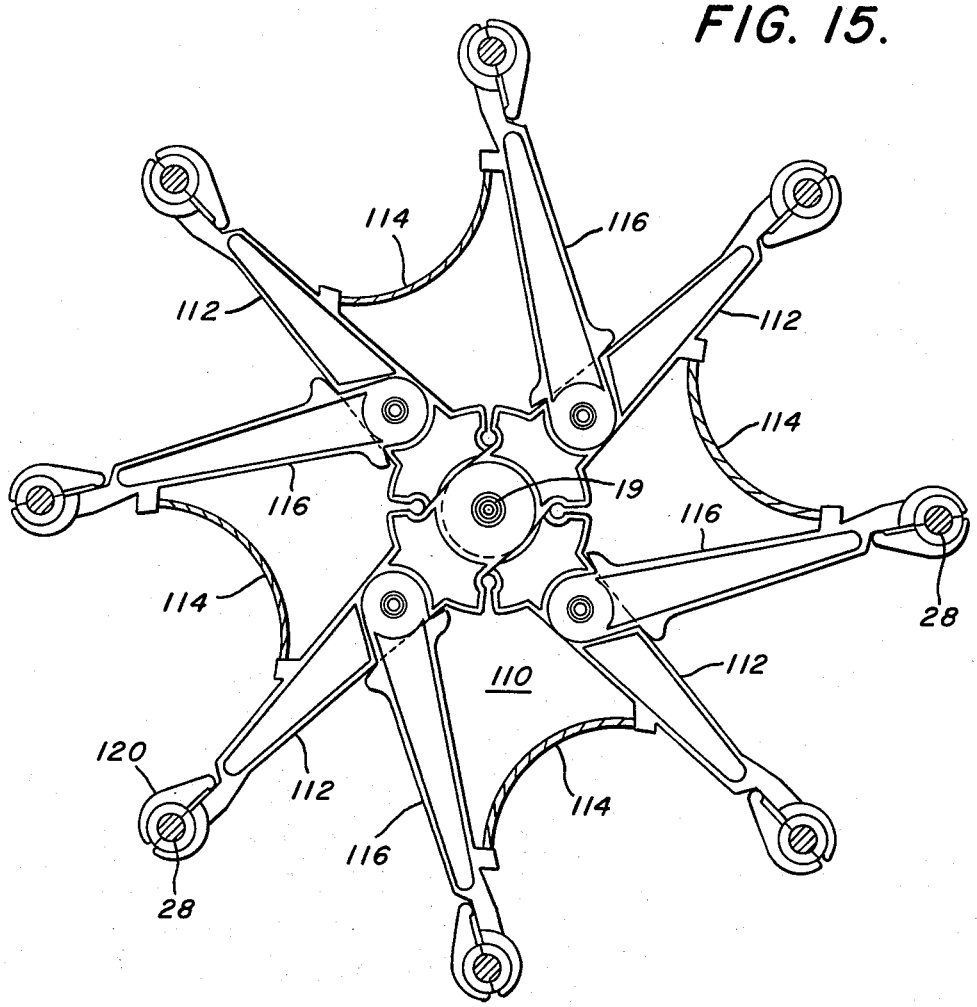
FIG. 15 is a side elevation of an eight conductor damping spacer of the invention.
Figure 17:
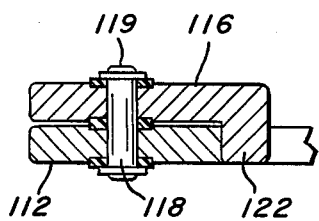
FIGS. 17 and 18 are sectional views of the damping spacer of FIG. 16 taken respectively along lines XVII—XVII and XVIII—XVIII in FIG. 16.
Figure 18:
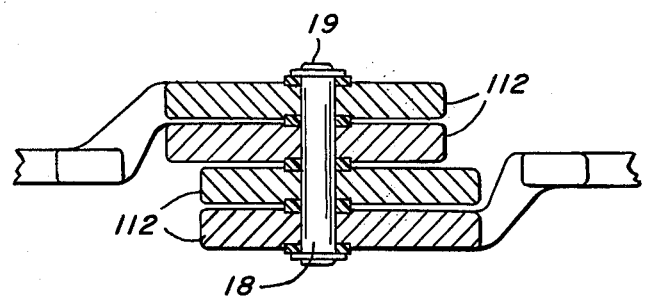

In FIG. 15 of the drawings, a damping spacer 110 of the invention is shown in which four basic or main spacer arms 112, are modified simply and inexpensively to space and damp an eight conductor bundle using only four damping cables 114 and a hub thickness and pin length essentially the same as a basic four conductor spacer of the invention, as evidenced by the sectional view of FIG. 18. This is accomplished by the use of four additional, elongated spacer arms 116 pivotally connected to the four basic arms 112 at a location (119) intermediate the location (18 and 19) at which the basic arms are pivotally connected together and the location of conductor clamps 120 of the arms. The pivotal connections between the basic and additional arms may be respectively made by pivot pins 118 (FIG. 17) in a manner similar to that of the main connection of the basic arms 112 at 18, and as described above in connection with the spacer of FIGS. 1 and 2. The four additional arms 116 are each shown provided with lateral extensions 122 adapted to abut against the basic arms 112 with the occurrence of a predetermined amount of relative movement between them. As indicated in FIG. 17, extensions 122 may extend to a position in line with the main arms.

As seen in FIG. 15, the four damping cables 114 extend respectively between a basic arm and the additional arm pivotally connected to the next adjacent basic arm (in proceeding in a clockwise direction in FIG. 15) to provide damping of conductor motion when any one of the eight conductors vibrates or oscillates.

While the invention has been described in terms of preferred embodiments, the claims appended hereto are intended to encompass all embodiments which fall within the spirit of the invention.

Having thus described my invention and certain embodiments thereof, I claim:

1. A damping spacer for parallel, overhead conductors, the damping spacer comprising at least two rigid, spacer arms each having a conductor clamp at one end and rigid pin means pivotally connecting the other ends of the arms together about the axis of the rigid pin means, and, a stranded wire cable extending between said arms resiliently connecting the arms together.

2. The damping spacer of claim 1 in which the stranded wire cable is held in compression between the rigid arms.

3. The damping spacer of claim 1 in which the stranded wire cable, when under tension, spaces the arms and any conductors to which the arms are attached.

4. The damping spacer of claim 1 in which the stranded wire cable bows in an inwardly direction toward a central location of the spacer, the stranded wire cable lying in the general plane of the spacer.

5. The damping spacer of claim 1 in which the stranded wire cable bows in an outwardly direction away from a central location of the spacer and in the general plane of the spacer.

6. The damping spacer of claim 1 in which the stranded wire cable bows outwardly and away from a central location of the spacer, and in a direction generally perpendicular to the plane of the spacer.

7. The damping spacer of claim 1 in which the stranded wire cable joins the arms at locations adjacent the locations of the conductor clamps.

8. The damping spacer of claim 1 in which the spacer arms include arm portions extending a predetermined distance beyond the location of the rigid pin means pivotally connecting the arms together in respective directions away from the conductor clamps, with the stranded wire cable extending between said arm portions.

9. The damping spacer of claim 1 in which the arms of the spacer are provided with openings aligned to receive the rigid pin means, and a heat resistant washer is located between the arms, with the rigid pin means extending through said openings and said washer.

10. The damping spacer of claim 9 in which the diameters of the rigid pin means and the openings in the spacer arms are substantially the same.

11. The damping spacer of claim 9 including a friction bushing located around the portion of the rigid pin means extending through the opening of at least one of the spacer arms, the bushing having an original inner diameter somewhat less than the diameter of the rigid pin means.

12. The damping spacer of claim 11 in which the bushing is split along its length to permit ease of assembly of the rigid pin means and bushings, and to permit contraction of the bushing on the rigid pin means with wear of the bushing.

13. The damping means of claim 1 in which the rigid pin means is a rivet structure having a flange formed at each end.

14. The damping spacer of claim 1 in which the spacer arms are provided with mating, spaced apart, and relatively deep teeth structures, said teeth structures adapted to provide impact damping with the occurrence of conductor vibration or oscillation, and to provide a means for limiting relative, rotational movement of the arms.

15. The damping spacer of claim 1 in which the number of spacer arms is at least three, said arms being pivotally connected to each other adjacent a central location of the spacer, and extending radially outwardly from said central location, the number of stranded wire cables being at least three, said stranded wire cables extending respectively between the spacer arms, and maintaining the arms in angularly spaced relationship to each other.

16. The damping spacer of claim 15 in which the three stranded wire cables extend from positions in the general plane of the spacer to two, respective, opposed positions offset from the general plane of the spacer.

17. A damping spacer for parallel, overhead conductors, the damping spacer comprising two elongated arm structures, one of which has one end pivotally connected to the other structure at a location intermediate its ends, the two arm structures providing at least three rigid spacer columns, with a conductor clamp at the end of each column remote from the location of the pivot connection, and, at least one elongated, stranded wire cable extending between and resiliently connecting the two arm structures together, said stranded wire cable providing sliding friction between component strands of the stranded wire cable upon the occurrence of relative movement of the two arm structures.

18. A damping spacer for parallel, overhead conductors, the damping spacer comprising at least two rigid spacer arms each having a conductor clamp at one end and means pivotally connecting the other ends of the arms to each other, an additional rigid spacer arm having a conductor clamp at one end, and means pivotally connecting the other end of said additional arm to one of the arms pivotally connected together, and, a stranded wire cable extending between the additional arm and the other of said arms pivotally connected to each other, said stranded wire cable resiliently connecting the additional arm and the other arm together.

* * * * *

UNITED STATES PATENT OFFICE
CERTIFICATE OF CORRECTION

PATENT NO. : 3,925,595
DATED : December 9, 1975
INVENTOR(S) : Ronald G. Hawkins

It is certified that error appears in the above-identified patent and that said Letters Patent are hereby corrected as shown below:

| | |
|---|---|
| Column 1, line 51 | Change "3,613,014" to --3,613,104--. |
| Column 1, line 62 | Change "Vally" to --Valley--. |
| Column 2, line 18 | Change "stright" to --straight--. |
| Column 2, line 49 | Change "element" to --elements--. |
| Column 3, line 24 | Change "spaces" to --spacers--. |
| Column 3, lines 27-28 | Change "minumum" to --minimum--. |

Signed and Sealed this eighteenth Day of May 1976

[SEAL]

Attest:

RUTH C. MASON
Attesting Officer

C. MARSHALL DANN
Commissioner of Patents and Trademarks